US 6,730,362 B2

(12) United States Patent
Finch et al.

(10) Patent No.: US 6,730,362 B2
(45) Date of Patent: May 4, 2004

(54) COATED ARTICLE WITH POLYMERIC BASECOAT CURED AT LOW TEMPERATURES

(75) Inventors: John G. Finch, Livonia, MI (US); Joseph A. Elmer, Lake Orion, MI (US); Daniel E. Ford, Ypsilanti, MI (US); Patrick A. Sullivan, Niwot, CO (US); Robert C. Bishop, Boulder, CO (US)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 10/228,029

(22) Filed: Aug. 26, 2002

(65) Prior Publication Data

US 2004/0038037 A1 Feb. 26, 2004

(51) Int. Cl.⁷ .................................................. B05D 1/36
(52) U.S. Cl. ................................. 427/419.1; 427/419.2; 427/419.5; 427/419.7; 427/294
(58) Field of Search .......................... 427/419.1, 419.2, 427/419.5, 419.7, 404, 294, 295, 296, 250, 255.23

(56) References Cited

U.S. PATENT DOCUMENTS 6,572,974 B1 * 6/2003 Biscotte et al. ............. 428/450

* cited by examiner

Primary Examiner—Daniel S. Metzmaier
Assistant Examiner—Christopher Keehan
(74) Attorney, Agent, or Firm—Emch, Schaffer, Schaub & Porcello Co., L.P.A.

(57) ABSTRACT

A multi-layer vapor deposited protective and decorative coating a polymeric basecoat layer wherein the polymer of the basecoat layer is cured at subatmospheric pressure.

6 Claims, 2 Drawing Sheets

COATED ARTICLE WITH POLYMERIC BASECOAT CURED AT LOW TEMPERATURES

FIELD OF THE INVENTION

This invention relates to coated articles with a polymeric basecoat wherein the polymeric basecoat is cured at low or sub-atmospheric pressures.

BACKGROUND OF THE INVENTION

Coated articles wherein the coating includes a polymeric basecoat layer and a vapor deposited, such as physical vapor deposited, decorative and protective layer comprised of a zirconium compound or titanium compound on the polymeric basecoat layer are known and are disclosed in U.S. Pat. No. 6,168,242. These known polymeric basecoats are cured at ambient pressures. While these ambient pressure cured polymeric basecoats result in decorative and/or protective coatings which are quite good, it would be advantageous if the polymeric basecoat exhibited improved vacuum compatibility for applying the vapor deposited refractory metal compound layers in a vacuum chamber, provided better leveling, minimized color changes, and provided improved mechanical properties. It is an object of the present invention to provide such a polymeric basecoat.

SUMMARY OF THE INVENTION

In accordance with the instant invention a decorative and/or protective coating is provided on an article. The coating comprises a polymeric basecoat which is cured at low or sub-atmospheric pressures is provided on the surface of an article. On the low pressure cured polymeric basecoat layer is then deposited, by vapor deposition such as physical vapor deposition, one or more vapor deposited layers. The vapor deposited layers include the refractory metals and refractory metal compounds.

DESCRIPTION OF THE PREFERRED EMBODIMENT

Figure 1:
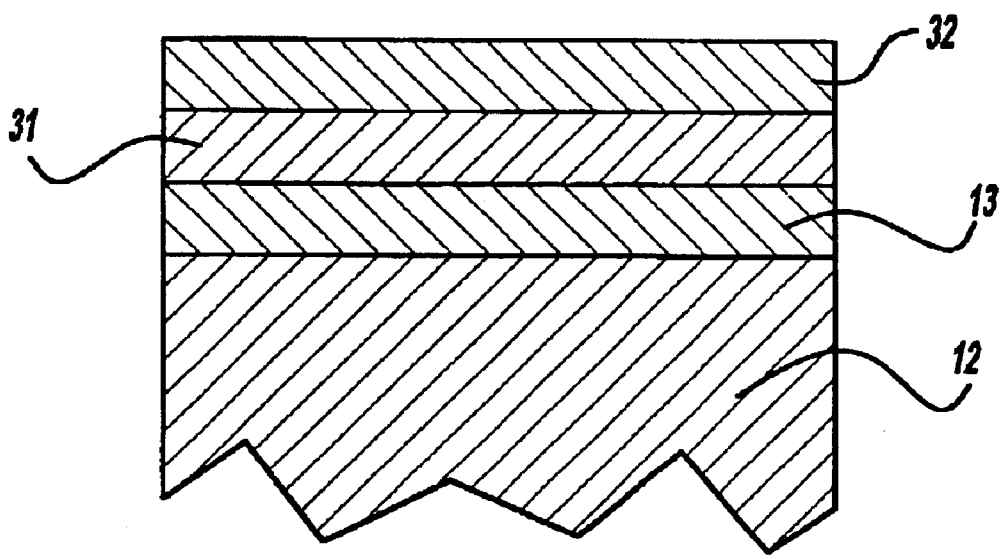
FIG. 1 is a cross-sectional view, not to scale, of a portion of an article having the multi-layer coating of the instant invention.

The article or substrate 12 can be comprised of any material onto which a plated layer can be applied, such as plastic, e.g., ABS, polyolefin, polyvinylchloride, and phenolformaldehyde, ceramic, metal or metal alloy. In one embodiment it is comprised of a metal or metallic alloy such as copper, stele, brass, zinc, aluminum, nickel alloys and the like.

In the instant invention a polymeric or resinous layer which is cured under low pressure, below atmospheric, conditions is applied onto the surface of the article. A second layer or series of layers is applied onto the surface of the polymer by vapor deposition. The polymeric layer serves, inter alia, as a basecoat which levels the surface of the article and as a corrosion protective layer.

The polymeric basecoat layer 13 may be comprised of both thermoplastic and thermoset polymeric or resinous material. These polymeric or resinous materials include the well known, conventional and commercially available polycarbonates, epoxy urethanes, polyacrylates, polymethacrylates, nylons, polyesters, polypropylenes, polyepoxies, alkyds and styrene containing polymers such as polystyrene, styrene-acrylonitrile (SAN), styrene-butadiene acrylonitrile-butadiene-styrene (ABS), and blends and copolymers thereof.

The polycarbonates are described in U.S. Pat. Nos. 4,579,910 and 4,513,037, both of which are incorporated herein by reference.

Nylons are polyamides which can be prepared by the reaction of diamines with dicarboxylic acids. The diamines and dicarboxylic acids which are generally utilized in preparing nylons generally contain from two to about 12 carbon atoms. Nylons can also be prepared by additional polymerization. They are described in "Polyamide Resins", D. E. Floyd, Reinhold Publishing Corp., New York, 1958, which is incorporated herein by reference.

The polyepoxies are disclosed in "Epoxy Resins", by H. Lee and K. Nevill, McGraw-Hill, New York, 1957, and in U.S. Pat. Nos. 2,633,458; 4,988,572; 4,680,076; 4,933,429 and 4,999,388, all of which are incorporated herein by reference.

The polyesters are polycondensation products of an aromatic dicarboxylic acid and dihydric alcohol. The ardmic dicarboxylic acids include terephthalic acid, isophthalic acid, 4,4'-diphenyl-dicarboxylic acid, 2,6-naphthalenedicarboxylic acid, and the like. Dihydric alcohols include the lower alkane diols with from two to about 10 carbon atoms such as, for example, ethylene glycol, propylene glycol, cyclohexanedimethanol, and the like. Some illustrative non-limiting examples of polyesters include polyethylene terephthalate, polybutylene terephthalate, polyethylene isophthalate, and poly(1,4-cyclohexanedimethylene terephthalate). They are disclosed in U.S. Pat. Nos. 2,645,319; 2,901,466 and 3,047,539, all of which are incorporated herein by reference.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylates or polymethacrylates" as it appears therein. The polymerization of the monomeric acrylates and methacrylates to provide the polyacrylate resins useful in the practice of the invention may be accomplished by any of the well known polymerization techniques.

The styrene-acrylonitrile and acrylonitrile-butadiene-styrene resins and their preparation are disclosed, inter alia, in U.S. Pat. Nos. 2,769,804; 2,989,517; 2,739,142; 3,991,136 and 4,387,179, all of which are incorporated herein by reference.

The alkyd resins are disclosed in "Alkyd Resin Technology", Patton, Interscience Publishers, NY, N.Y., 1962, and in U.S. Pat. Nos. 3,102,866; 3,228,787 and 4,511,692, all of which are incorporated herein by reference.

The epoxy urethanes and their preparation are disclosed, inter alia, in U.S. Pat. Nos. 3,963,663; 4,705,841; 4,035,274; 4,052,280; 4,066,523; 4,159,233; 4,163,809; 4,229,335 and 3,970,535, all of which are incorporated by reference. Particularly useful epoxy urethanes are those that are electrocoated onto the article. Such electrodepositable epoxy urethanes are described in the afore-mentioned U.S. Pat. Nos. 3,963,663; 4,066,523; 4,159,233; 4,035,274 and 4,070,258.

These polymeric materials may optionally contain the conventional and well known fillers such as mica, talc and glass fibers.

The polymeric basecoat layer 13 may be applied onto the surface of the substrate by any of the well known and conventional methods such as dipping, spraying, brushing and electrodeposition. It is cured under low, i.e., subatmospheric, pressure conditions.

The polymeric layer 13 functions, inter alia, to level the surface of the substrate, cover any scratches or imperfections in the surface of the article and provide a smooth and even surface for the deposition of the succeeding layers such as the vapor deposited layers.

The polymeric basecoat layer 13 has a thickness at least effective to level out the surface of the article or substrate and to provide corrosion resistance. Generally, this thickness is at least about 0.12 μm, preferably at least about 2.5 μm, and more preferably at least about 5 μm. The upper thickness range should not exceed about 250 μm.

In some instances, depending on the substrate material and the type of polymeric basecoat, the polymeric basecoat does not adhere sufficiently to the substrate. In such a situation a primer layer is deposited on the substrate to improve the adhesion of the polymeric basecoat to the substrate. The primer layer can be comprised, inter alia, of halogenated polyolefins. The halogenated polyolefins are conventional and well known polymers that are generally commercially available. The preferred halogenated polyolefins are the chlorinated and brominated polyolefins, with the chlorinated polyolefins being more preferred. The halogenated, particularly chlorinated, polyolefins along with methods for their preparation are disclosed, inter alia, in U.S. Pat. Nos. 5,319,032; 5,840,783; 5,385,979; 5,198,485; 5,863,646; 5,489,650 and 4,273,894, all of which are incorporated herein by reference.

The thickness of the primer layer is a thickness effective to improve the adhesion of the polymeric basecoat layer to the substrate. Generally, this thickness is at least about 0.25 μm. The upper thickness is not critical and generally is controlled by secondary considerations such as cost and appearance. Generally an upper thickness of about 125 μm should not be exceeded.

The polymeric basecoat layer is cured at pressure conditions below ambient, i.e., below atmospheric pressures. That is to say, the polymer comprising the basecoat layer is cured at low or sub-atmospheric pressure conditions. These sub-atmospheric pressure conditions are generally below about $10^{-3}$ torr, preferably below about $10^{-4}$ torr, and more preferably below about $10^{-5}$ torr. The polymeric basecoat is generallycured at elevated temperatures. Generally, these temperatures and the time at which the polymer is kept at these temperatures depend upon the polymer. Generally these temperatures are above about 100° F., preferably above about 300° F., and the times are from about 20 minutes to about an hour.

In the practice of the instant invention the polymer coated article is inserted into a vacuum chamber, such as for example a vacuum oven, and the vacuum chamber is evacuated to the desired sub-atmospheric pressure. The polymer coated article is kept in the vacuum chamber until the polymer is cured.

In the instant invention the preferred polymers are those which can be electrodeposited on the article. Particularly preferred electrodeposited polymers are the above described epoxy urethanes.

Over the sub-atmospheric pressure or vacuum cured polymeric layer 13 is deposited by vapor deposition, such as physical vapor deposition or chemical vapor deposition, at least a protective and color layer 32 comprised of a refractory metal compound or a refractory metal alloy compound. The refractory metal compound includes a hafnium compound, a tantalum compound, a titanium compound or a zirconium compound, preferably a titanium compound or a zirconium compound. The refractory metal alloy compound includes the alloys of refractory metals such as a zirconium-titanium alloy compound. The compounds include the nitrides, oxides, carbides and carbonitrides. Thus, for example, the zirconium compounds include the zirconium nitrides, zirconium carbides, zirconium oxides and zirconium carbonitrides; and the titanium compounds include the titanium nitrides, titanium carbides, titanium oxides and titanium carbonitrides. The preferred refractory metal compounds and refractory metal alloy compounds are the refractory metal nitrides and refractory metal alloy nitrides.

The thickness of this color and protective layer 32 is a thickness which is at least effective to provide the color and to provide abrasion resistance, scratch resistance, and wear resistance. Generally, this thickness is at least about 25 Å, preferably at least about 250 Å, and more preferably at least about 500 Å. The upper thickness range is generally not critical and is dependent upon secondary considerations such as cost. Generally a thickness of about 0.75 μm, preferably about 0.5 μm should not be exceeded.

One method of depositing layer 32 is by physical vapor deposition utilizing reactive sputtering or reactive cathodic arc evaporation. Reactive cathodic arc evaporation and reactive sputtering are generally similar to ordinary sputtering and cathodic arc evaporation except that a reactive gas is introduced into the chamber which reacts with the dislodged target material. Thus, in the case where zirconium nitride is the layer 32, the cathode is comprised of zirconium and nitrogen is the reactive gas introduced into the chamber.

In the embodiment illustrated in FIG. 1 the color and protective layer 32 is disposed on a strike layer 31 comprised of refractory metal or refractory metal alloy. The refractory metals include hafnium, tantalum, zirconium and titanium. The refractory metal alloys include zirconium-titanium alloy, zirconium-hafnium alloy and titanium-hafnium alloy. The refractory metal layer or refractory metal alloy layer 31, if disposed intermediate the polymeric basecoat layer 13 and the color layer 32 as illustrated in FIG. 1, generally functions, inter alia, as a strike layer which improves the adhesion of the color layer 32 to the polymeric basecoat layer. As illustrated in FIG. 1, the refractory metal or refractory metal alloy strike layer 31 is generally disposed intermediate the color layer 32 and the polymeric layer 13. Layer 31 has a thickness which is generally at least effective for layer. 31 to function as a strike layer. Generally, this thickness is at least about 60 Å, preferably at least about 120 Å, and more preferably at least about 250 Å. The upper thickness range is not critical and is generally dependent upon considerations such as cost. Generally, however, layer 31 should not be thicker than about 1.2 μm, preferably about 0.40 μm, and more preferably about 0.25 μm.

The refractory metal or refractory metal alloy layer 31 is deposited by conventional and well known vapor deposition techniques including physical vapor deposition techniques such as cathodic arc evaporation (CAE) or sputtering. Sputtering techniques and equipment are disclosed, inter alia, in J. Vossen and W. Kern "Thin Film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a chromium metal or refractory metal (such as titanium or zirconium) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge chromium, titanium or zirconium atoms. The dislodged target material is then typically deposited as a coating film on the substrate.

In cathodic arc evaporation, an electric arc of typically several hundred amperes is struck on the surface of a metal cathode such as zirconium or titanium. The arc vaporizes the cathode material, which then condenses on the substrates forming a coating.

In a preferred embodiment of the present invention the refractory metal is comprised of titanium or zirconium, preferably zirconium, and the refractory metal alloy is comprised of zirconium-titanium alloy.

It is to be understood that strike layer 31 may be dispensed with and layer 32 may be deposited directly on the basecoat layer 13.

The additional vapor deposited layers may also include refractory metal compounds and refractory metal alloy compounds other than the above described nitrides. These refractory metal compounds and refractory metal alloy compounds include the refractory metal oxides and refractory metal alloy oxides; refractory metal carbides and refractory metal alloy carbides; reaction products of (a) refractory metal or refractory metal alloy, (b) oxygen, and (c) nitrogen; and the refractory metal carbonitrides and refractory metal alloy carbonitrides.

Figure 2:
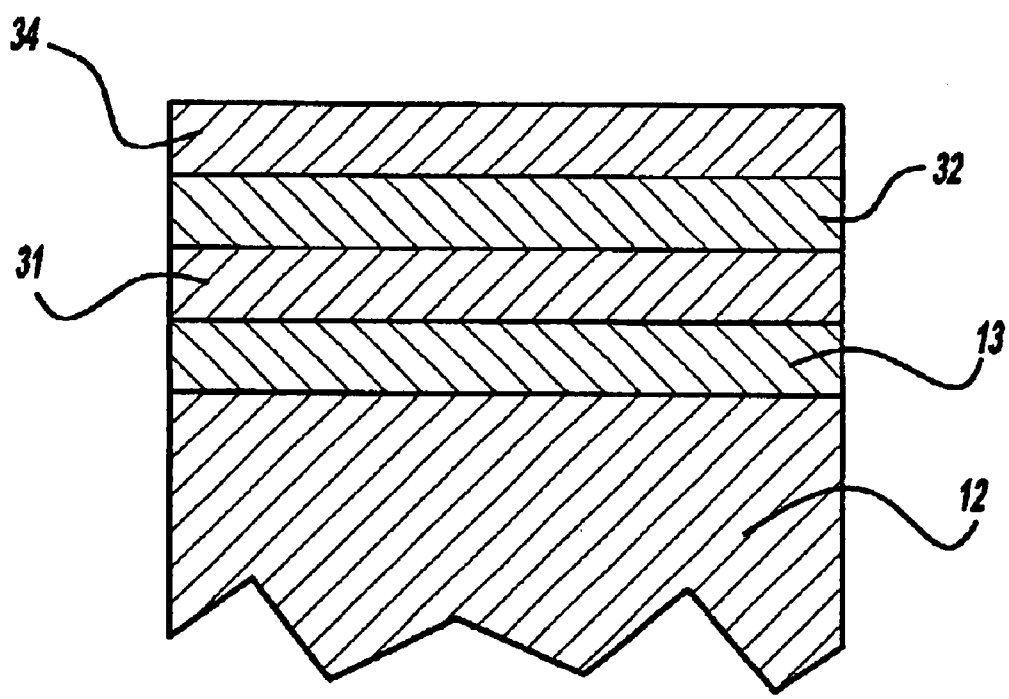
FIG. 2 is similar to FIG. 1 except that a refractory metal oxide or refractory metal alloy oxide is present as a top layer.

In one embodiment of the invention as illustrated in FIG. 2 a layer 34 comprised of the reaction products of (i) a refractory metal or metal alloy, (ii) an oxygen containing gas such as oxygen, and (iii) nitrogen is deposited onto layer 32. The metals that may be employed in the practice of this invention are those which are capable of forming both a metal oxide and a metal nitride under suitable conditions, for example, using a reactive gas comprised of oxygen and nitrogen. The metals may be, for example, tantalum, hafnium, zirconium, zirconium-titanium alloy, and titanium, preferably titanium, zirconium-titanium alloy and zirconium, and more preferably zirconium.

The reaction products of the metal or metal alloy, oxygen and nitrogen are generally comprised of the metal or metal alloy oxide, metal or metal alloy nitride and metal or metal alloy oxy-nitride.

Thus, for example, the reaction products of zirconium, oxygen and nitrogen comprise zirconium oxide, zirconium nitride and zirconium oxy-nitride. These metal oxides and metal nitrides including zirconium oxide and zirconium nitride alloys and their preparation and deposition are conventional and well known, and are disclosed, inter alia, in U.S. Pat. No. 5,367,285, the disclosure of which is incorporated herein by reference.

The layer 34 can be deposited by well known and conventional vapor deposition techniques, including reactive sputtering and cathodic arc evaporation.

In another embodiment instead of layer 34 being comprised of the reaction products of refractorymetal or refractory metal alloy, oxygen and nitrogen, it is comprised of refractory metal oxides or refractory metal alloy oxides. The refractory metal oxides and refractory metal alloy oxides of which layer 34 is comprised include, but are not limited to, hafnium oxide, tantalum oxide, zirconium oxide, titanium oxide, and zirconium-titanium alloy oxide, preferably titanium oxide, zirconium oxide, and zirconium-titanium alloy oxide, and more preferably zirconium oxide. These oxides and their preparation are conventional and well known.

Layer 34 is effective in providing improved chemical, such as acid or base, resistance to the coating. Layer 34 containing (i) the reaction products of refractory metal or refractory metal alloy, oxygen and nitrogen, or (ii) refractory metal oxide or refractory metal alloy oxide generally has a thickness at least effective to provide improved chemical resistance. Generally this thickness is at least about 10 Å, preferably at least about 25 Å, and more preferably at least about. 40 Å. Layer 34 should be thin enough so that it does not obscure the color of underlying color layer 32. That is to say layer 34 should be thin enough so that it is non-opaque or substantially transparent. Generally layer 34 should not be thicker than about 500 Å, preferably about 150 Å, and more preferably about 70 Å.

Figure 3:
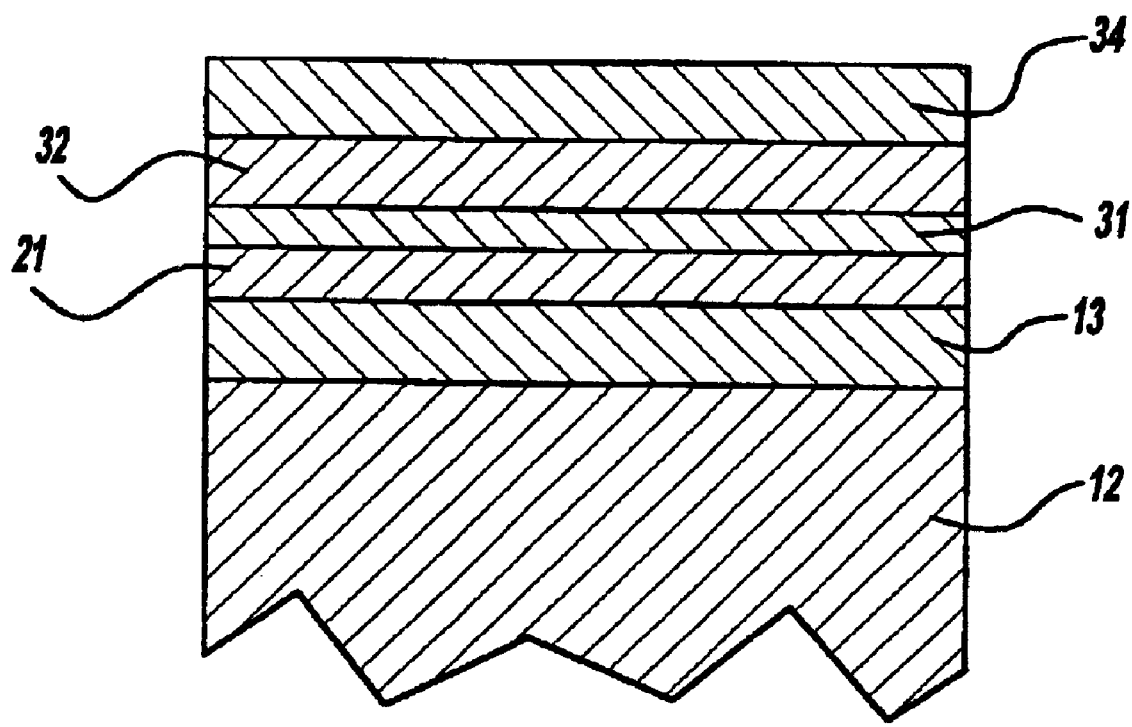
FIG. 3 is similar to FIG. 2 except that a metal layer is disposed intermediate the polymeric basecoat layer and the color layer.

In another embodiment of the invention, as illustrated in FIG. 3, intermediate the vacuum cured basecoat layer 13 and the vacuum deposited refractory metal and/or refractory metal compound layer(s) e.g., 31, 32 there are disposed metal or metal alloy layers 21. These layers 21 may be plated onto the polymeric layer 13 as by electroplating or electroless plating, or they may be vacuum deposited. Thee metal or metal alloy layers include, but are not limited to, chromium, tin-nickel alloy, and the like. When layer 21 is comprised of chromium it may be deposited on the nickel vacuum cured basecoat layer 13 by conventional and well known chromium vapor deposition techniques or electroplating techniques. The plating techniques along with various chrome plating baths are disclosed in Brassard, "Decorative Electroplating—A Process in Transition", Metal Finishing, pp. 105–108, June 1988; Zaki, "Chromium Plating", PF Directory, pp. 146–160; and in U.S. Pat. Nos. 4,460,438; 4,234,396; and 4,093,533, all of which are incorporated herein by reference.

Chrome plating baths are well known and commercially available. A typical chrome plating bath contains chromic acid or salts thereof, and catalyst ion such as sulfate or fluoride. The catalyst ions can be provided by sulfuric acid or its salts and fluosilicic acid. The baths may be operated at a temperature of about 112°–116° F. Typically in chrome plating a current density of about 150 amps per square foot, at about 5 to 9 volts is utilized.

The chrome layer generally has a thickness of at least about 0.05 μm, preferably at lest about 0.12 μm, and more preferably at least about 0.2 μm. Generally, the upper range of thickness is not critical and is determined by secondary considerations such as cost. However, the thickness of the chrome layer should generally not exceed about 1.5 μm, preferably about 1.2 μm, and more preferably about 1 μm.

Instead of layer 21 being comprised of chromium it may be comprised of tin-nickel alloy, that is an alloy of nickel and tin. The tin-nickel alloy layer may be deposited on the surface of the substrate by conventional and well known tin-nickel electroplating processes. These processes and plating baths are conventional and well known and are disclosed, inter alia, in U.S. Pat. Nos. 4,033,835; 4,049,508; 3,887,444; 3,772,168 and 3,940,319, all of which are incorporated herein by reference.

The tin-nickel alloy layer is preferably comprised of about 60–70 weight percent tin and about 30–40 weight percent nickel, more preferably about 65% tin and 35% nickel representing the atomic composition SnNi. The plating bath contains sufficient amounts of nickel and tin to provide a tin-nickel alloy of the afore-described composition.

A commercially available tin-nickel plating process is the NiColloy™ process available from ATOTECH, and described in their Technical Information Sheet No: NiColloy, Oct. 30, 1994, incorporated herein by reference.

The thickness of the tin-nickel alloy layer 21 is generally at least about 0.25 $\mu$m, preferably at least about 0.5 $\mu$m, and more preferably at least about 1.2 $\mu$m. The upper thickness range is not critical and is generally dependent on economic considerations. Generally, a thickness of about 50 $\mu$m, preferably about 25 $\mu$m, and more preferably about 15 $\mu$m should not be exceeded.

In order that the invention may be more readily understood, the following example is provided. The example is illustrative and does not limit the invention thereto.

EXAMPLE

Clean faucets are mounted on racks and lowered into a tank of epoxy urethane paint. A voltage is applied to the parts and slowly ramped to negative 100 V relative to anodes on the sides of the tank, while maintaining the current below 1 ampere. The electric charge transferred (Coulombs) should be about 60% of the total by the time negative 100 V is reached. The total charge transferred to the faucet along with the surface area of the faucet determine the final thickness of the paint film. For a single faucet, about 20 to 30 coulombs of charge transfer are required to obtain a paint thickness of about 0.5 mils. The racks are then lifted out of the paint tank and sequentially dipped into a set of three rinse tanks, each subsequent rinse tank containing less paint and more de-ionized water with a resistivity exceeding $10^6$ ohm-cm.

Following the last rinse, the coated faucets are placed in a vacuum oven, the oven is evacuated to a pressure of $10^{-6}$ torr, the temperature is raised to 560° F., and the epoxy urethane polymer is cured at this pressure and temperature for about 30 minutes.

The cured polymer coated faucets are placed in a cathodic arc evaporation plating vessel. The vessel is generally a cylindrical enclosure containing a vacuum chamber which is adapted to be evacuated by means of pumps. A source of argon gas is connected to the chamber by an adjustable valve for varying the rate of flow of argon into the chamber. In addition, a source of nitrogen gas is connected to the chamber by an adjustable valve for varying the rate of flow of nitrogen into the chamber.

A cylindrical cathode is mounted in the center of the chamber and connected to negative outputs of a variable D.C. power supply. The positive side of the power supply is connected to the chamber wall. The cathode material comprises zirconium.

After the zirconium layer is deposited a zirconium nitride protective and color layer is deposited on the zirconium layer. A flow of nitrogen is introduced into the vacuum chamber while the arc discharge continues at approximately 500 amperes. The flow of nitrogen is a flow which will produce a zirconium nitride layer having nitrogen content of about 14 to 35 percent. This flow is about 10 to 20% of total flow, and is continued for about 20 to 35 minutes to form a zirconium nitride layer having a thickness of about 1,500 to 7,500 Å. After this zirconium nitride layer is deposited the nitrogen flow is terminated and a flow of oxygen of approximately 30 to 70 standard liters per minute is introduced for a time of about 10 to 60 seconds. A thin layer of zirconium oxide with a thickness of about 10 to 100 Å is formed. The arc is extinguished, the vacuum chamber is vented and the coated articles removed.

While certain embodiments of the invention have been described for purposes of illustration, it is to be understood that there may be various embodiments and modifications within the general scope of the invention.

What is claimed is:

1. A method of providing a multi-layer protective and decorative coating on at least a portion of an article surface comprising:

applying a polymeric basecoat layer onto said surface and curing said polymeric basecoat at subatmospheric pressure wherein said polymeric basecoat layer is an epoxy-urethane layer; and applying by physical vapor deposition onto said polymeric basecoat layer a protective and color layer comprised of refractory metal compound or refractory metal alloy compound.

2. The method of claim 1 wherein said subatmospheric pressure is below about $10^{-3}$ torr.

3. The method of claim 2 wherein said subatmospheric pressure is below about $10^{-4}$ torr.

4. The method of claim 1 wherein a refractory metal oxide layer or refractory metal alloy oxide is applied by physical vapor deposition over said protective and color layer.

5. The method of claim 1 wherein a layer comprised of reactional products of refractor metal or refractory metal alloy, oxygen and nitrogen is applied by physical vapor deposition over said color layer.

6. A method of providing a multi-layer protective and decorative coating on at least a portion of an article surface comprising:

applying a polymeric basecoat layer onto said surface and curing said polymeric basecoat at subatmospheric pressure wherein said polymeric basecoat layer is an epoxy-urethane layer;

applying a chromium layer onto said epoxy-urethane layer; and applying by physical vapor deposition onto said chromium layer a protective and color layer comprised of refractory metal compound or refractory metal alloy compound.

* * * * *

UNITED STATES PATENT AND TRADEMARK OFFICE
CERTIFICATE OF CORRECTION

PATENT NO. : 6,730,362 B2
DATED : May 4, 2004
INVENTOR(S) : John G. Finch et al.

It is certified that error appears in the above-identified patent and that said Letters Patent is hereby corrected as shown below:

Title page,
Item [54], Title, please delete "TEMPERATURES" and insert -- PRESSURES --.
Item [57], ABSTRACT, after "coating", insert -- including --.

Signed and Sealed this

Eighth Day of February, 2005

JON W. DUDAS
*Director of the United States Patent and Trademark Office*